United States Patent Office 3,473,659
Patented Oct. 21, 1969

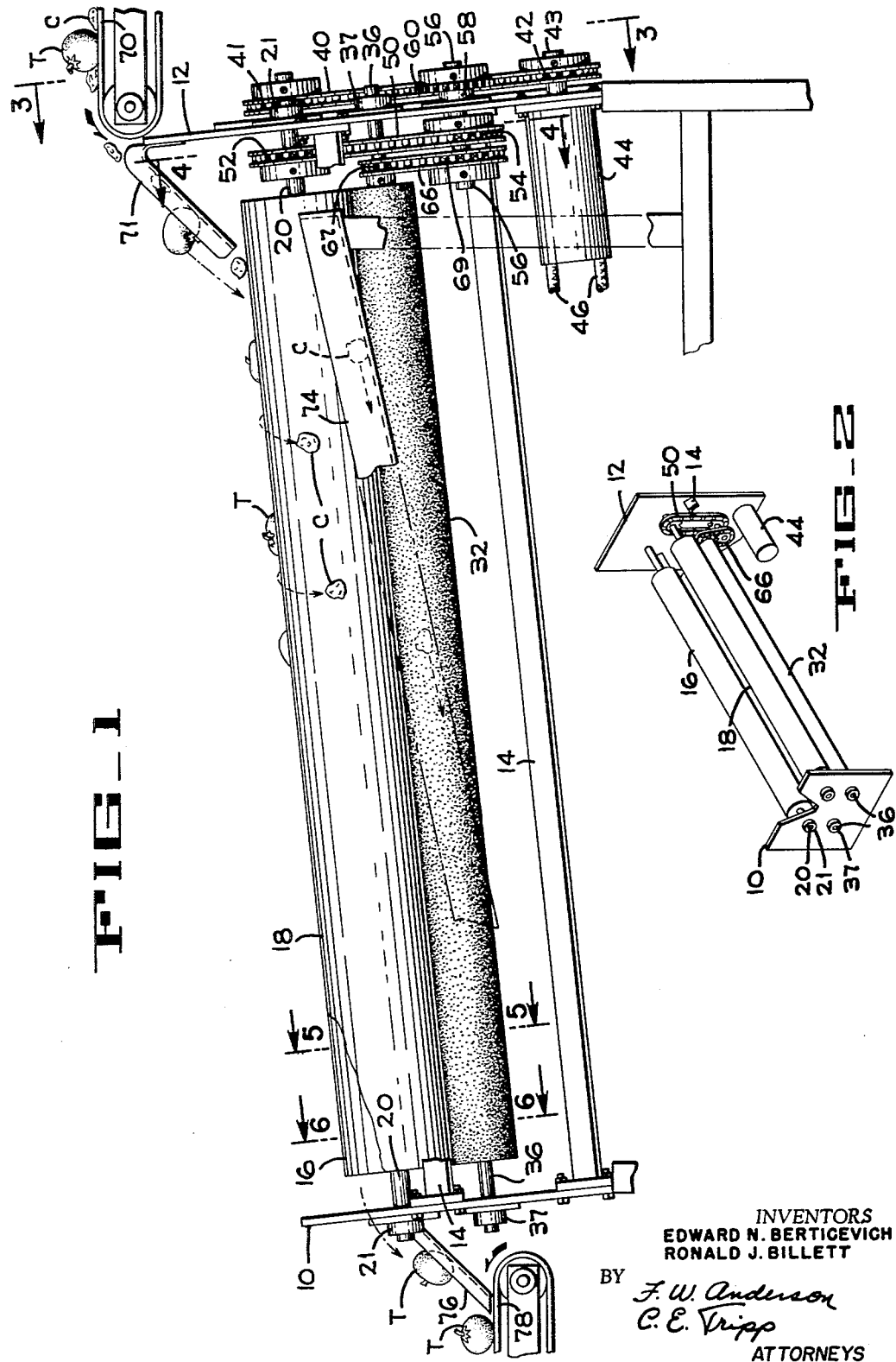
FIG_1
FIG_2
INVENTORS
EDWARD N. BERTICEVICH
RONALD J. BILLETT
BY F. W. Anderson
C. E. Tripp
ATTORNEYS

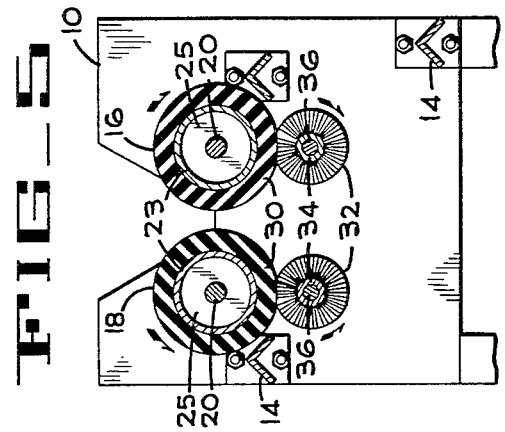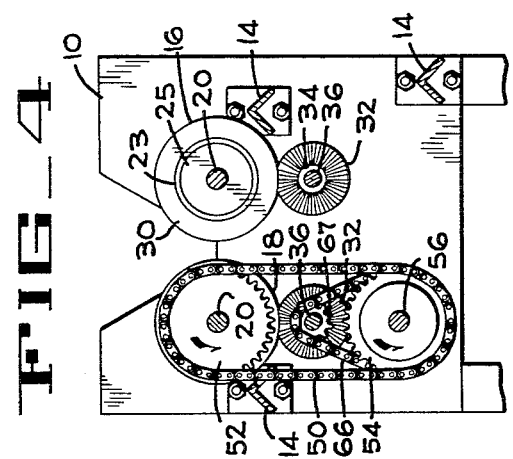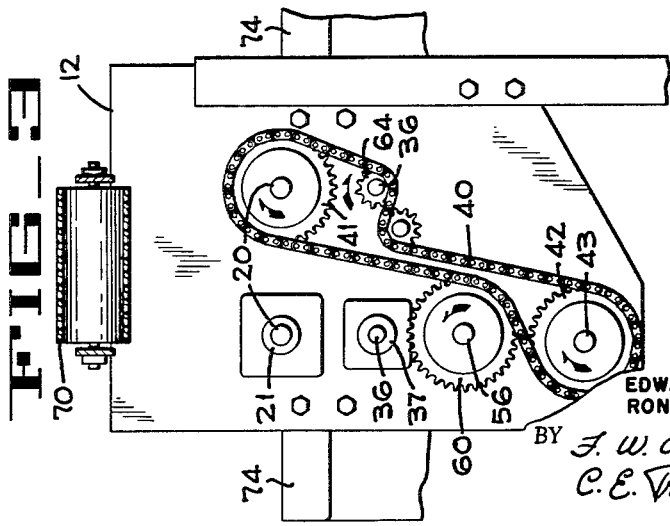

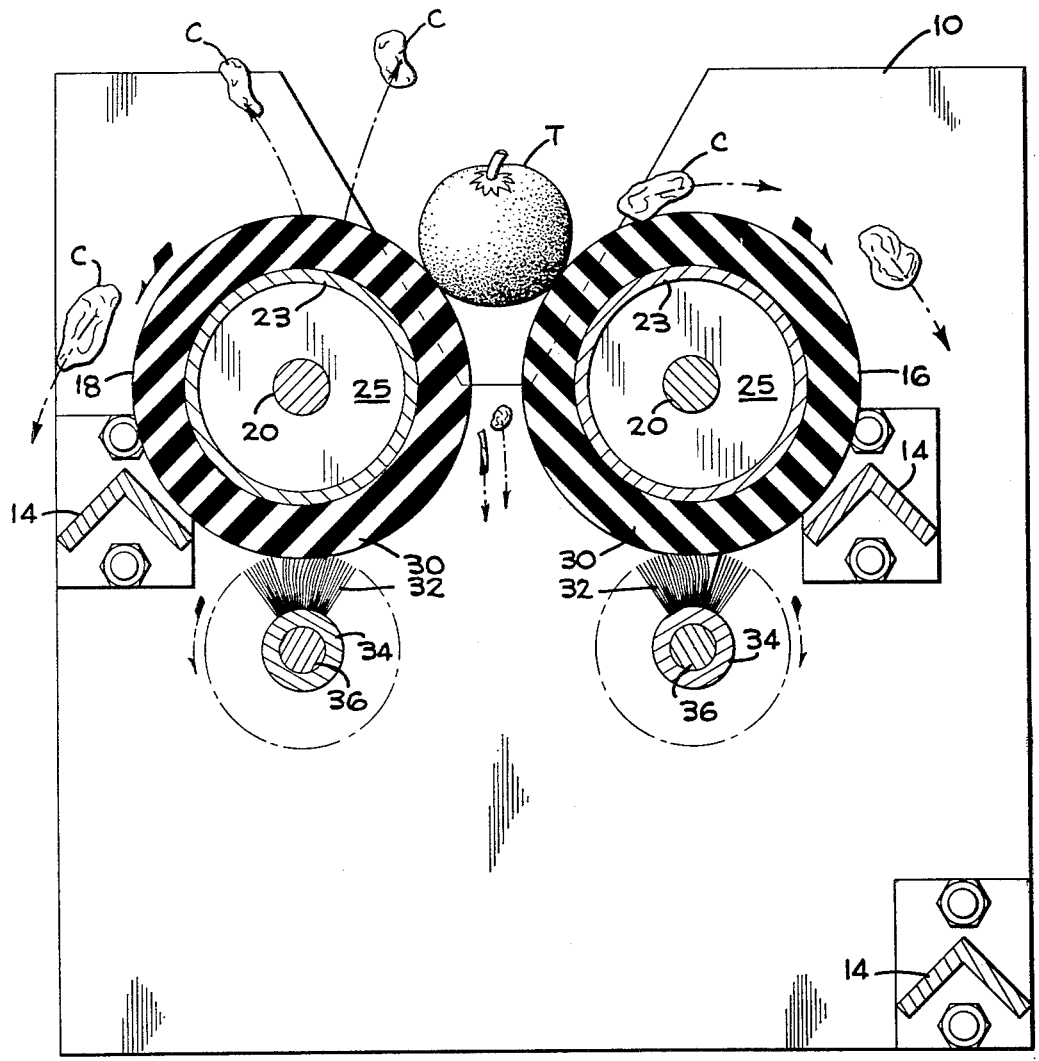
FIG_6

3,473,659
METHOD AND APPARATUS FOR SEPARATING ARTICLES
Edward N. Berticevich, San Jose, and Ronald J. Billett, Sunnyvale, Calif., assignors to FMC Corporation, San Jose, Calif., a corporation of Delaware
Filed Sept. 25, 1967, Ser. No. 670,361
Int. Cl. B07c 5/34
U.S. Cl. 209—108                              5 Claims

ABSTRACT OF THE DISCLOSURE

Elongate rollers are arranged in close side-by-side relation so that their upper surfaces define a downwardly inclined channel adapted to receive a mixture of loose dirt, dirt clods and fruit such as tomatoes. The rollers, which rotate in opposite directions so that their upper surfaces move outwardly away from each other, are made of relatively soft, flexible material so that irregular objects, such as dirt clods are gripped by the rotating rollers and moved upwardly and outwardly and are discharged over the sides of the rollers. The fruit, due to its relatively smooth, rounded surfaces, is not gripped by the rollers and moves downwardly along the channel defined between the rollers to be discharged at the lower end of the channel.

BACKGROUND OF THE INVENTION

This invention relates to apparatus for separating fruit from dirt with which it is associated while it is harvested. More particularly, it relates to apparatus for separating dirt and dirt clods from vine crops, such as tomatoes, which are harvested by cutting or digging the vines from the ground by an operation that results in an accumulation of fruit, loose dirt, dirt clods, and other debris.

In the usual type of harvester, dirt and other debris are separated from the fruit by conveying it on a conveyor made up of spaced transverse rods and allowing the dirt to drop through the spaces between adjacent rods. Alternately the fruit can be separated from debris manually by picking the fruit out of the mass as it moves along a belt or is disposed on a sorting table.

SUMMARY OF THE INVENTION

This invention involves a method and apparatus for separating smooth objects from irregular objects by making use of the discovery that rollers having relatively soft, resilient surfaces will grip irregular objects placed between adjacent rollers and raise them upwardly and outwardly, and discharge them laterally over the sides of the rollers, while permitting articles such as tomatoes that have relatively smooth surfaces to move longitudinally along the upper surfaces of the rollers to a discharge station adjacent the ends of the rollers.

DESCRIPTION OF THE DRAWINGS

FIGURE 1 is a side elevation, partly broken away, of a machine constructed in accordance with the present invention.

FIGURE 2 is a schematic perspective of the machine of FIG. 1.

FIGURES 3, 4, 5 and 6 are fragmentary vertical sections taken respectively along lines 3—3, 4—4, 5—5 and 6—6 of FIG. 1, FIG. 6 being drawn to an enlarged scale.

DESCRIPTION OF THE PREFERRED EMBODIMENT

The embodiment of the separating device shown in FIGURES 1 and 2 comprises generally a pair of spaced end plates 10 and 12 which are connected by a plurality of angle bars 14 to form a rigid support structure. A pair of identical rollers 16 and 18 are disposed between the end plates, each roller having a center shaft 20 rotatably journalled at each end in a bearing 21 on one of the end plates. The two rollers are identical, and each includes a metal tubular body 23 which is closed at its opposite ends by a circular plate 25 that is secured, as by welding, to the tubular body and is connected to the shaft 20 for rotation therewith. Bonded to the tubular body 23 is a sleeve 30 of resilient material so that rotation of each shaft 20 causes rotation of the sleeve 30.

Disposed below each roller is a cylindrical brush 32 comprising a tubular bristle holder 34 that is secured to a shaft 36 which is rotatably journalled adjacent its ends in bearings 37 carried by the end plates 10 and 12.

The roller 16 is driven by a chain 40 that is trained around a sprocket 41 keyed to the roller shaft 20 and around a sprocket 42 that is keyed to the drive shaft 43 of an hydraulic motor 44. The motor 44 is bolted to the inner face of end plate 12 and is provided with conventional hydraulic power lines 46.

The roller 18 is driven by a chain 50 (FIG. 4) that is trained around a sprocket 52 which is keyed to the roller shaft and around a sprocket 54 that is keyed to a stub shaft 56 (FIG. 1) which extends inwardly from the end plate 12 and is journalled for rotation in a bearing 58 mounted on plate 12. A sprocket 60, which is disposed on the opposite side of end plate 12 from sprocket 54, is also keyed to stub shaft 56 and, as seen in FIG. 3, the chain 40, that drives roller 16, is trained around a portion of sprocket 60.

The shaft 36 of the brush that is below roller 16 carries a sprocket 64 which is also driven by chain 40, while the shaft 36 of the brush below roller 18 is driven by a chain 66 which is trained around a sprocket 67 (FIG. 4) that is keyed to the brush shaft 36 and around a sprocket 69 keyed to stub shaft 56.

The drive arrangement is such that, when the motor is energized, the roller 16 rotates clockwise (FIG. 6) while the roller 18 rotates counterclockwise, and each brush 32 rotates in the same angular direction as its associated roller.

In operation a mixture of loose dirt, dirt clods, and fruit is delivered by a conveyor 70 to a chute 71 which directs the mixture into the upper end of the inclined channel defined by the upper surfaces of the rollers. As the rollers rotate, the loose dirt and small debris passed downwardly through the space between the rollers. Each dirt clod strikes one of the rotating rollers. Because the surface is yieldable and resilient, the clods will tend to be caught in the roller surface and accelerated upwardly. Accordingly they will be thrown upwardly and outwardly over the sides of the rollers onto a collection chute 74, one of which is disposed at each side of the apparatus, or will be thrown from one roller to the other. In any event the clod is eventually moved upwardly with sufficient force and in the proper direction to be thrown laterally over the sides of the rollers.

The tomatoes T, due to their smooth rounded surfaces, are not gripped by the rollers and proceed down the inclined channel and are discharged at the lower end thereof onto a chute 76 which directs them to a conveyor 78.

The roller surface must be such that tomatoes will slip and will not be thrown or bounced. Sponge and foam rubber are materials which may be used for the other article-contacting surface of the rollers. Besides having a surface that will permit sliding of tomatoes and the like, the material of the rollers should be resilient enough to cause the clods to bounce.

In one successful installation the rollers 30 were about 5 inches in diameter and the material of the sleeve 18 of each roller was about 0.5 inch thick and made of Armaflex #20 which is marketed by Armstrong Cork Co. of Lancaster, Pa. This material is a nitrille rubber vinyl that has a density of from 5 to 6 pounds per cubic foot and will deflect about 25% when subject to a load of 5 pounds per square inch. The rollers were rotated at about 350 r.p.m. and were slanted downwardly at about 10 degrees relative to the horizontal. The spacing B (FIG. 6) between rollers was about 1¼ inches.

To increase durability, the surface of the rubber may be covered with a neoprene sheet having a 30–35 durometer value.

Having thus described our invention, what we claim as new and desire to protect by Letters Patent is:

1. The method separating articles having irregular surfaces from articles having smooth surfaces comprising the steps of depositing a mixture of such articles on uniformly spaced, diverging friction surfaces forming a downwardly inclined channel, moving said surfaces upwardly at a speed sufficient to cause one or the other surfaces to throw the larger irregular objects up, over and clear of that surface, the speed of said surfaces being insufficient to throw the smooth articles so that the latter settle into and move down the inclined channel.

2. Apparatus for separating articles having irregular surfaces, such as dirt clods or the like, from articles having smooth surfaces, such as fruit or the like; said apparatus comprising a pair of elongate cylindrical rollers of uniform diameter disposed in side-by-side generally parallel relation, the axes of said rollers being downwardly inclined, said rollers being spaced so that the upper surfaces of said rollers define an open channel, and means for rotating said rollers so that their adjacent surfaces move upwardly and outwardly away from each other, the surfaces of said rollers being made of a resilient, yieldable friction material for flexing inwardly under the irregular dirt clods and to attain a gripping engagement with the clods, said roller rotating means giving the rollers a peripheral speed sufficient for causing individual rollers to throw clods gripped thereby upwardly and away from the rollers for discharge over the side of the roller or over the side of the adjacent roller, said roller speed being insufficient to throw the smooth articles so that the latter slide along the rollers.

3. Apparatus according to claim 2 wherein the resilient yieldable material of said rollers is foam rubber.

4. Apparatus according to claim 2 wherein the resilient yieldable material of said rollers is a sponge rubber.

5. Apparatus according to claim 2 including brush means associated with each roller for cleaning the surface of the roller.

References Cited
UNITED STATES PATENTS

| | | | |
|---|---|---|---|
| 844,049 | 2/1907 | Schumacher | 209—108 |
| 1,148,589 | 8/1915 | Johnson | 209—108 |
| 2,168,519 | 8/1939 | Du Brul | 209—108 X |
| 2,714,411 | 8/1955 | Aguilar et al. | 209—108 X |

ALLEN N. KNOWLES, Primary Examiner